United States Patent
Lendl et al.

(10) Patent No.: US 11,243,162 B2
(45) Date of Patent: Feb. 8, 2022

(54) METHOD FOR SPECTROSCOPICALLY OR SPECTROMETRICALLY EXAMINING A SAMPLE, AND INTERFEROMETRIC DEVICE

(71) Applicant: TECHNISCHE UNIVERSITAET WIEN, Vienna (AT)

(72) Inventors: Bernhard Lendl, Vienna (AT); Jakob Hayden, Vienna (AT); Bettina Baumgartner, Vienna (AT); Christian Kristament, Sigmundsherberg (AT)

(73) Assignee: TECHNISCHE UNIVERSITAET WIEN, Vienna (AT)

( * ) Notice: Subject to any disclaimer, the term of this patent is extended or adjusted under 35 U.S.C. 154(b) by 0 days.

(21) Appl. No.: 16/634,075

(22) PCT Filed: Jul. 26, 2018

(86) PCT No.: PCT/AT2018/060164
§ 371 (c)(1),
(2) Date: Jan. 24, 2020

(87) PCT Pub. No.: WO2019/018870
PCT Pub. Date: Jan. 31, 2019

(65) Prior Publication Data
US 2020/0166453 A1    May 28, 2020

(30) Foreign Application Priority Data
Jul. 26, 2017   (AT) .............................. A 50623/2017

(51) Int. Cl.
*G01N 21/3577*   (2014.01)
*G01N 21/359*    (2014.01)
(Continued)

(52) U.S. Cl.
CPC ....... *G01N 21/3577* (2013.01); *G01N 21/359* (2013.01); *G01N 21/39* (2013.01);
(Continued)

(58) Field of Classification Search
CPC ................. G01N 21/359; G01N 21/39; G01N 2021/1731; G01N 2021/451;
(Continued)

(56) References Cited

U.S. PATENT DOCUMENTS 3,825,347 A  *  7/1974  Kaiser ................ G01N 21/3504
                                                    356/451
4,571,082 A  *  2/1986  Downs .................... G01N 21/45
                                                    356/491

(Continued)

FOREIGN PATENT DOCUMENTS

DE   69817131 T2   5/2004
EP   2738543 A2    6/2014

OTHER PUBLICATIONS

Espacenet English translation of EP2738543 (Year: 2013).*
(Continued)

*Primary Examiner* — Mohamed K Amara
(74) *Attorney, Agent, or Firm* — McCoy Russell LLP

(57) ABSTRACT

A method and an interferometric device for spectroscopically or spectrometrically examining a sample, comprising: a) generating a laser beam having a wavelength, b) splitting the laser beam into a measurement beam and a reference beam, c) interacting the sample with the measurement beam, d) interacting a reference with the reference beam, e) overlaying the measurement beam and the reference beam, f) detecting a first output beam, g) detecting a second output beam, h) forming a differential signal between the first output signal and the second output signal, i) controlling the differential signal to a predefined target value, j) determining (Continued)

a refractive index of the sample from the adjustment of the phase difference between the measurement beam and the reference beam, k) repeating steps a) to j) for additional wavelengths of the laser beam.

14 Claims, 2 Drawing Sheets

(51) Int. Cl.
G01N 21/39 (2006.01)
G01N 21/45 (2006.01)
G01N 21/17 (2006.01)

(52) U.S. Cl.
CPC ..... *G01N 21/45* (2013.01); *G01N 2021/1731* (2013.01); *G01N 2021/451* (2013.01)

(58) Field of Classification Search
CPC ........... G01N 2021/1714; G01N 21/35; G01N 21/17; G01N 21/41; G01N 21/3577; G01N 21/45
See application file for complete search history.

(56) References Cited

U.S. PATENT DOCUMENTS

| | | | | |
|---|---|---|---|---|
| 5,367,175 A * | 11/1994 | Bobb | ................ | G01D 5/35303 250/227.14 |
| 5,710,630 A * | 1/1998 | Essenpreis | ......... | A61B 5/14532 356/479 |
| 6,128,080 A * | 10/2000 | Janik | ....... | G01N 21/45 356/491 |
| 6,429,023 B1 * | 8/2002 | Gharavi | ............ | G01N 21/7703 356/478 |
| 7,061,619 B2 * | 6/2006 | Shirai | .................... | G01N 21/05 356/477 |
| 7,920,267 B2 * | 4/2011 | Cho | .................... | G01N 21/553 356/445 |
| 8,218,151 B2 * | 7/2012 | Peled | ................. | G01N 21/7703 356/477 |
| 8,446,592 B1 * | 5/2013 | Arissian | ............ | G01B 9/02003 356/484 |
| 8,663,563 B2 * | 3/2014 | Savran | ................... | G01B 11/14 422/82.05 |
| 9,709,490 B2 * | 7/2017 | Sugimoto | .......... | G01M 11/0228 |
| 10,627,396 B2 * | 4/2020 | Bornhop | ........... | G01N 21/41 |
| 2002/0031838 A1 * | 3/2002 | Meinhart | ........... | G01N 21/05 436/514 |
| 2004/0239944 A1 | 12/2004 | Shirai et al. | | |
| 2004/0257579 A1 * | 12/2004 | Shirai | .................... | G01N 21/45 356/477 |
| 2006/0045809 A1 * | 3/2006 | Shirai | .............. | G01N 33/54373 422/82.11 |
| 2007/0046951 A1 * | 3/2007 | Hill | ........................... | G01J 9/02 356/512 |
| 2009/0015842 A1 * | 1/2009 | Leitgeb | .............. | G01B 9/02003 356/456 |
| 2009/0097107 A1 * | 4/2009 | Walla | ..................... | G01N 21/45 359/370 |
| 2010/0103421 A1 * | 4/2010 | Johansen | ............... | G01N 21/03 356/367 |
| 2010/0195110 A1 * | 8/2010 | Iwai | ..................... | G01B 9/0201 356/450 |
| 2011/0102802 A1 * | 5/2011 | Izatt | ........................ | A61B 3/102 356/479 |
| 2011/0228260 A1 * | 9/2011 | Yablon | .............. | G01B 9/02084 356/73.1 |
| 2012/0194804 A1 * | 8/2012 | He | .......................... | G01N 21/05 356/128 |
| 2013/0222811 A1 * | 8/2013 | Handerek | ............. | G01L 11/025 356/477 |
| 2013/0265566 A1 * | 10/2013 | Smith | ........................ | G01J 3/10 356/39 |
| 2015/0062589 A1 * | 3/2015 | Osawa | ............... | G01B 9/02027 356/479 |
| 2015/0144791 A1 * | 5/2015 | Simpkin | ............... | G01N 21/274 250/339.07 |
| 2016/0265898 A1 * | 9/2016 | Schreuder | ............. | G01N 21/45 |
| 2016/0313246 A1 * | 10/2016 | Wong | ................... | G01N 21/553 |
| 2017/0315053 A1 * | 11/2017 | Sugimoto | .............. | G01N 21/45 |
| 2018/0080868 A1 * | 3/2018 | Shiramizu | .......... | G01N 21/3581 |
| 2018/0238794 A1 * | 8/2018 | Kangas | ...................... | G01J 3/42 |
| 2018/0274899 A1 * | 9/2018 | Yamazaki | ............ | G01B 9/0207 |
| 2019/0162526 A1 * | 5/2019 | Williams | ........... | G01B 9/02002 |
| 2020/0263972 A1 * | 8/2020 | Yamauchi | .......... | G01N 15/1463 |

OTHER PUBLICATIONS

Mazzoni, D. et al., "Trace detection of hydrazines by optical homodyne interferometry," Applied Optics, vol. 30, No. 7, Mar. 1, 1991, 10 pages.

Lechuga, L. et al., "Feasibility of evanescent wave interferometer immunosensors for pesticide detections: chemical aspects," Sensors and Actuators B, vol. 25, No. 1-3, Apr. 1995, 4 pages.

Sieger, M. et al., "On-Chip Integrated Mid-Infrared GaAs/AlGaAs Mach-Zehnder Interferometer," Analytical Chemistry, vol. 85, No. 6, Nov. 6, 2012, 3 pages.

Hayden, J. et al., "A quantum cascade laser-based Mach-Zehnder interferometer for chemical sensing employing molecular absorption and dispersion," Applied Physics B, vol. 124, No. 29, Feb. 2018, Available Online Jan. 27, 2018, 9 pages.

ISA European Patent Office, International Search Report Issued in Application No. PCT/AT2018/060164, Oct. 23, 2018, WIPO, 6 pages.

* cited by examiner

METHOD FOR SPECTROSCOPICALLY OR SPECTROMETRICALLY EXAMINING A SAMPLE, AND INTERFEROMETRIC DEVICE

CROSS-REFERENCE TO RELATED APPLICATIONS

The present application is a U.S. National Phase of International Patent Application Serial No. PCT/AT2018/060164 entitled "METHOD FOR SPECTROSCOPICALLY OR SPECTROMETRICALLY EXAMINING A SAMPLE, AND INTERFEROMETRIC DEVICE," filed on Jul. 26, 2018. International Patent Application Serial No. PCT/AT2018/060164 claims priority to Austrian Patent Application No. A 50623/2017 filed on Jul. 26, 2017. The entire contents of each of the above-referenced applications are hereby incorporated by reference for all purposes.

TECHNICAL FIELD

The invention relates to a method for the spectroscopic or spectrometric analysis of a sample preferably in the infrared spectral range.

The invention further relates to an interferometric device for the spectroscopic analysis of a liquid sample preferably in the infrared spectral range, including:
- a tunable laser for emitting a laser beam preferably in the infrared spectral range,
- a beam-splitting element for splitting the laser beam into a measurement beam and a reference beam,
- a measurement chamber for the interaction between the sample and the measurement beam,
- a reference chamber for the interaction between a reference and the reference beam,
- a beam-combining element with a first outlet port for the interferometric superposition of the measurement beam and the reference beam as the first output beam and with a second outlet port for the interferometric superposition of the measurement beam and the reference beam as the second output beam, wherein the first output beam and the second output beam differ from one another by 180° in their phase,
- a first detector for capturing the first output beam,
- a second detector for capturing the second output beam,
- a phase-control element for setting a phase between the measurement beam and the reference beam.

BACKGROUND

Such an interferometer is known in particular from EP 2 738 543 A2. The sensitivity of this prior art is, however, low, and even approaches zero for small concentrations of the analyte. In this prior art, on the one hand, a differential signal is detected, which is the destructive interference of the measurement beam and the reference beam. Moreover, a sum signal is formed from the measurement and reference beams. The differential signal and sum signal are merely brought into a correlation via a division in order to check the intensity of the laser. Moreover, this prior art always requires two measurements for each wavelength, namely one with and one without a sample, as the path lengths must always be first set to the same optical path length. Furthermore, fluctuations in the optical path length in the prior art lead to an impairment of the result, as the latter is dependent on the set optical path lengths of the paths. It is further not possible with this prior art to record a spectrum. With the provided path-length modification element, the optical path length must and can only be set at the same value for both paths; the actual measurement occurs at one wavelength only.

US 2004/0239944 A1 discloses an interferometer in which the light is combined and split again by two optical waveguides of an optical combiner/splitter and two photodetectors measure the interference light in each case. The working point can be controlled by adjusting the wavelength or temperature. The object of this document, however, only serves to determine an amount or concentration of adsorbed substance. It is moreover also necessary with this object to conduct two measurements, respectively one with and one without a sample. In order to conduct these measurements, i.e. to determine the amount of substance, the wavelength must be adjusted; the method is consequently not suitable for recording a spectrum of the refractive index. Moreover, this system must have two paths of different lengths, as otherwise a modification of the wavelength or temperature of the two paths (namely simultaneously in this document) would not lead to a phase shift. This prior art can thus not be combined with the interferometer of EP 2 738 543 A2, the function of which presupposes in particular identical optical path lengths.

DE 698 17 131 T2 relates to an interferometer which is useful for measuring optically induced changes in the optical properties of samples of materials to be analyzed, e.g. of temporally resolved optical nonlinearities. The object of this document is, however, not suitable for recording a spectrum of a sample, as a laser with a specific (i.e. not tunable) wavelength is provided and also absolutely indispensable in order to conduct the coupling/decoupling of the probe laser by means of wavelength-dependent mirrors. Furthermore, the use of a photodetector is provided, which reacts exactly to one measurement-beam wavelength and the sample to be tested ought to be transparent for the measurement-beam wavelength. Moreover, a control loop is provided in this document merely for the compensation of drifts through vibrations, thermal shift, surrounding noises, etc. The sensitivity of this known method is low, as the refractive index is determined directly from the outputs of the first and second optical guides, i.e. their interference signal.

Spectroscopic analyses in the infrared spectral range (IR) in an aqueous environment are only possible to a very limited extent due to the high absorption of water in the infrared spectral range. The most characteristic absorption bands of many organic groups, however, lie exactly in the infrared spectral range. In order to remedy the disadvantages of known spectroscopy methods, such as FTIR spectroscopy or ATR spectroscopy, EP 2 738 543 A2 proposes a fixed interferometer with equal optical path lengths for the measurement and reference beams, which should deliver a background-free optical measurement. The interferometer can be set here to complete destructive interference in the absence of the analyte in the measuring cell. In the next step, the analyte can be introduced, whereby a low differential signal is obtained. The spectroscopy in the differential measurement method ought to lead to a significantly better signal-to-noise ratio in comparison with conventional spectrometers. A background-free measurement which suppresses the intensive substrate absorption of the water by optical means is thus rendered possible by utilizing the coherence of a tunable laser source through destructive interference in the prior art.

This approach was also proposed in the abstract "A QCL-based Mach-Zehnder interferometer for chemical sensing", Jakob Hayden et al., during the conference FLAIR 2016.

It has been shown in practice that the suppression of the substrate signal works satisfactorily. With more detailed mathematical analysis, however, it has been shown that the sensitivity of the destructively superposed desired signal is low. For small concentrations of the analyte, the sensitivity approaches zero. For this reason, various measures have been considered how the sensitivity can be increased with the existing measurement structure. For example, the intensity of the reference beam can be increased in relation to the measurement beam, for example by using beam splitters with different splitting ratios. Alternatively, the transmission distance in the measuring cell in relation to the reference cell can be chosen so as to be different. Although measurement precision can be increased with these measures, there is still need for improvement.

The object of the present invention is thus to alleviate or eliminate the disadvantages of the prior art. The invention aims in particular at conducting qualitative and quantitative analyses in particular of liquid samples with high sensitivity.

This object is achieved by means of a method and an interferometric device.

The method according to the invention for the spectroscopic or spectrometric analysis of a sample in the infrared spectral range includes at least the following steps:

a) generating a laser beam with a wavelength preferably in the infrared spectral range,
b) splitting the laser beam into a measurement beam and a reference beam,
c) interaction of the sample with the measurement beam,
d) interaction of a reference with the reference beam,
e) interferometric superposition of the measurement beam and the reference beam so that a first output beam and a second output beam are obtained, the phases of which are shifted with respect to one another by 180°,
f) detecting the first output beam,
g) detecting the second output beam,
h) formation of a differential signal between the first output beam and the second output beam,
i) adjusting the differential signal to a predetermined setpoint by setting a phase difference between the measurement beam and the reference beam,
j) determination of a refractive index of the sample from the setting of the phase difference between the measurement beam and the reference beam,
k) repeating the steps a) to j) for further wavelengths of the laser beam preferably in the infrared spectral range for capturing a spectrum of the refractive index of the sample.

The interferometric device of the type described above is characterized by a subtractor for forming a differential signal between the first output beam and the second output beam a control unit which is adapted to adjust the differential signal by means of the phase-control element to a predetermined setpoint and to tune the wavelength of the laser beam in order to determine a spectrum of the refractive index of the sample from a position of the phase-control element depending on the wavelength of the laser beam.

The configuration according to the invention thus represents an abandonment of the known approach of trying to eliminate the background signal of the liquid sample by measurement of the destructively superposed signal. In contrast, a differential signal is formed in the invention from the first output beam and the second output beam, wherein the second output beam is phase-shifted by 180° in relation to the first output beam. The differential signal is controlled by adjustment of a phase-control element for each wavelength of the wavelength range to be analyzed in order to attain the predetermined setpoint. In the event of an alteration of the sample, a mutually corresponding shift of the signals of the first and second output beams is produced (in a wavelength-dependent manner), from which a deviation of the actual value of the differential signal from the setpoint results. This deviation is compensated via the phase-control element, wherein the modification of the state of the phase-control element is recorded. The set phase shift at the phase-control element correlates with the refractive index (i.e. with the difference in the refractive index between the reference and the liquid sample). By means of a tuning of the laser beam, a spectrum of the refractive index is obtained, which in turns depends on the concentration of the analyte in the liquid sample. Capturing the spectrum of the refractive index thus allows both qualitative as well as quantitative analyses of the liquid sample. By means of the simultaneous capturing of the first output beam and the second output beam as well as the subsequent subtraction, intensity fluctuations of the laser light source are also compensated, whereby a more stable measurement is achieved.

Preferably, a laser beam with a wavelength of 200 nanometres (nm) to 25 micrometres ($\mu m$) is used in order to conduct measurements in the ultra-violet spectral range and/or in the visible spectral range and/or in the near-infrared range (NIR) and/or in the mid-infrared range (MIR). Particularly preferably, the method is conducted in the NIR range with a wavelength of 0.75 $\mu m$ to 2.5 $\mu m$ and/or in the MIR range with a wavelength of more than essentially 2.5 $\mu m$.

In a first preferred application, the sample consists of a matrix and an analyte; the reference consists exclusively of the matrix. Depending on the application, the matrix is in particular a liquid solvent, preferably water.

In an alternative preferred configuration, the reference is a solid.

The solid can preferably be selected from the following group: $SiO_2$, $SiN$, $YF_3$, $TiO_2$, $Al_2O_3$, $HfO_2$, $Si$, $ZnSe$, $ZnS$, $CaF_2$, $MgF_2$, $BaF_2$, $GaAs$, $AgX$ (a mixture of $AgCl$ and $AgBr$), $C$ (as diamond or DLC "diamond like carbon"), chalcohalides (such as, e.g., Te—Ge—I) as well as chemical compounds of one or more chalcogen elements (oxygen, sulphur, selenium or tellurium) as formal anions with metals or more electropositive elements (arsenic, germanium, phosphorus, antimony, lead, boron, aluminium, gallium, indium, titanium, sodium, cadmium) as formal cations (typical examples that have been used as IR materials: Ge33% As12% Se55%, Ge30% As13% Se32% Te25%, Ge28% Sb12% Se60%, As40% Se60%. These materials can be readily structured in various ways and are essentially transparent in the spectral range of interest.

According to a particularly preferred variant embodiment, the differential signal between the first output beam and the second output beam is controlled to the setpoint zero. This embodiment is especially suitable for increasing the sensitivity of the measurement. The increase in sensitivity results from the fact that the setpoint zero of the differential signal corresponds to a relative phase position of +90° or −90° of the first and second output beams superposed at the output port of the interferometric device. The phase position of 90° relates to the superposed beams from the sample and reference beam path. For the first output beam, the phase between the sample and reference beams is +90°, for the second output beam −90°. The difference in the superposition in the two output beams (which respectively consist of two superposed partial beams) is thus constantly 180°. At this relative phase position, the change in the intensities measured at the detectors depending on the setting of the phase-control element is at a maximum, which enables a particularly precise setting of the phase-control element.

Preferably provided in the event of an integrated configuration of the interferometer are an input optical waveguide for the laser beam, a measurement-beam optical waveguide for the measurement beam and a reference-beam optical waveguide for the reference beam. The input, measurement-beam and reference-beam optical waveguides are preferably arranged on a die (i.e. a semiconductor wafer). A chip with an integrated interferometer is generally known from "On-Chip Integrated Mid-Infrared GaAs/AlGaAs Mach-Zehnder Interferometer", Markus Sieger et al., Analytical Chemistry 2013 85 (6), 3050-3052. In contrast to the interferometer presented there, the arrangement described here has a phase-control element, which influences the relative phase position of the partial beams during superposition and thus enables the adjustment of a differential signal to a specific value as described above.

For the required interaction between the sample and the measurement beam, on the one hand, and between the reference and the reference beam, on the other hand, the measurement chamber preferably includes a first microfluidic channel adjacent to the measurement-beam optical waveguide and/or the reference chamber includes a second microfluidic channel adjacent to the reference-beam optical waveguide. The interaction occurs here via the evanescent field of the measurement or reference beam, which projects out of the optical waveguide into the adjacent medium, i.e. the sample or the reference, while becoming exponentially weaker.

As an alternative to the use of a microfluidic channel for the reference chamber, the reference-beam waveguide can also be covered with a solid layer. The thickness of the solid layer formed on the reference-beam waveguide is preferably greater than the trebled depth of penetration of the evanescent field so that an interaction with a sample cannot occur. The solid of the solid layer preferably exhibits an essentially constant absorption as well as dispersion over time.

In terms of a structurally simple configuration of the integrated interferometer, it is advantageous if the phase-control element includes a heating element, in particular a resistance heating element, for the measurement-beam optical waveguide or for the reference-beam optical waveguide. The heating element is preferably arranged in the immediate vicinity of the measurement-beam optical waveguide. By changing the temperature, the effective refractive index of the (measurement-beam) optical waveguide is changed, and thus the phase of the guided light. The heating element is connected to a controllable power source, which is set by the control unit. The control variable is a gauge for the refractive index of the sample and is recorded, while the wavelength of the laser is tuned and the control unit controls the differential signal to the setpoint.

In order to couple the laser light or superpose the measurement beam and the reference beam, it is advantageous if the beam-splitting element includes a 1×2 coupler and the beam-combining element includes a 2×2 coupler. The 2×2 coupler brings the reference beam and the measurement beam to interference and directs the interfering beams into one or the other output waveguide depending on their relative phase position. Such a coupler can be, for example, a multi-mode interference coupler (MMI coupler). Viewed in the beam direction, the two output beams are detected after the 2×2 coupler. For this purpose, a first and a second output coupler can be provided, which respectively direct the beams to the first and second detector.

In an alternative configuration of the interferometer, the measurement chamber is configured as a first flow cell in the beam path of the measurement beam and the reference chamber is configured as a second flow cell in the beam path of the reference beam. In this configuration, the measurement beam passes through the first flow cell. The reference beam passes through the second flow cell.

In a further embodiment, a solid absorber is provided instead of the second flow cell.

In order to produce a phase shift for the adjustment of the differential signal between the first and second detector, it is particularly advantageous if the phase-control element includes a mirror and a piezo actuator for adjusting the mirror.

In this configuration, it is further advantageous if the beam-splitting element includes a first beam splitter and the beam-combining element includes a second beam splitter.

BRIEF DESCRIPTION OF THE FIGURES

The invention is further illustrated in the following with the aid of preferred example embodiments in the drawings.

DETAILED DESCRIPTION

Figure 1:
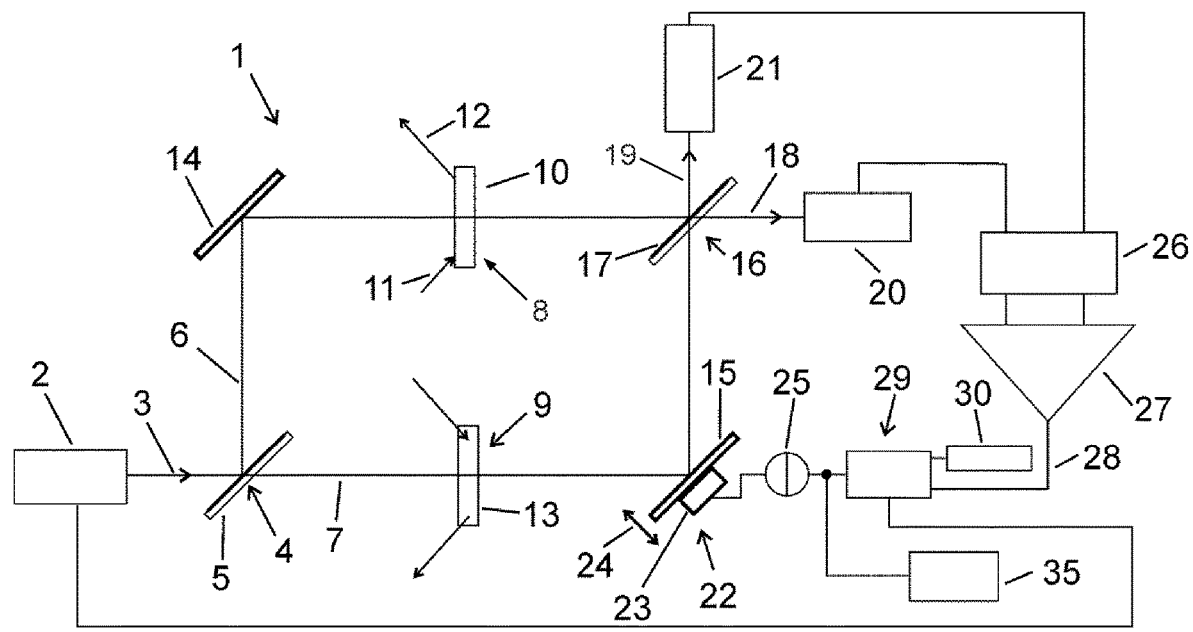
FIG. 1 shows a first preferred embodiment of an interferometric device for analyzing a liquid sample.

An interferometric device 1 for the spectroscopic analysis of a liquid sample in the infrared spectral range is shown schematically in FIG. 1. The interferometric device 1 includes a tunable laser 2 for emitting a laser beam 3 in the infrared spectral range. For example, a diode laser such as, e.g. a lead-salt laser, but also a semiconductor laser of a different design such as a quantum cascade laser (QCL) or an interband cascade laser (ICL) can be provided as the tunable laser. For the measurements of gases and liquids, thermally tunable DFB QCLs (distributed feedback quantum cascade lasers) or DFB ICLs (distributed feedback interband cascade lasers) are advantageous because of their line sharpness. For the measurement of liquids, however, broadly tunable EC QCLs (external cavity quantum cascade lasers) or EC ICLs (external cavity intraband cascade lasers), but also DFB lasers are particularly advantageous. Depending on the technical measurement requirement, at least one laser—if appropriate, however, also a plurality of lasers—can be implemented.

In the configuration shown, the interferometric device 1 includes a Mach-Zehnder interferometer; however, other types of interferometers, for example a Michelson interferometer, can also be provided. The interferometric device 1 includes a beam-splitting element 4, here a conventional beam splitter 5, for splitting the laser beam 3 into a measurement beam 6 and a reference beam 7. In addition, a measurement chamber 8 is provided for the interaction between the sample and the measurement beam 6 and a reference chamber 9 is provided for the interaction between a reference and the reference beam 7. The sample includes an analyte, which is contained in the shown embodiment in another substance or mixture of substances, the matrix; the reference consists of the matrix and/or of a suitable solid absorber. For example, substances dissolved in water such as sugar, proteins, organic acids, alcohols and the like can be provided as analytes. It is also possible with this measurement technique to measure substances dissolved in non-polar solvents such as fatty acid methyl esters, petroleum-derived hydrocarbons and the like. It is likewise possible to measure substances which do not exhibit any absorption in the infrared spectral range themselves, but modify the spectrum of the solvent by means of their presence. This is, e.g., the case when dissolved ions are present in water. In the case of gases, small molecules such as NO and the like, but also larger molecules such as VOCs (volatile organic compounds) in air, breath or in process streams of the most varied types can be analyzed.

In the configuration of FIG. 1, the measurement chamber is configured as a first flow cell 10 in the beam path of the measurement beam 6. The sample is fed to the first flow cell 10 via an inlet 11 and discharged via an outlet 12 after flowing through the flow cell 10. Accordingly, the reference chamber 9 is configured as a second flow cell 13, which is arranged in the beam path of the reference beam 7. The second flow cell 13 can be configured analogously to the first flow cell 10.

The interferometric device 1 further includes in the illustrated configuration a fixed mirror element 14 for deflecting the measurement beam 6, here by essentially 90°, between the beam splitter 5 and the measurement chamber 8 and a mirror 15 for deflecting the reference beam 7, here by essentially 90°, after the reference chamber 9 in the direction of the beam.

The interferometric device 1 further includes a beam-combining element 16 for superposing the measurement beam 6 and the reference beam 7. The beam-combining element 16 in this variant embodiment can be configured like the one in EP 2 738 543. In the configuration of FIG. 1, a further beam splitter 17 is thus configured as the beam-combining element 16. The beam-combining element 16 includes a first output port at which the measurement beam 6 and the reference beam 7 exit as the first output beam 18. At a second output port of the beam-combining element 16, the measurement beam 6 and the reference beam 7 exit as the second output beam 19, which exhibits a phase shift of 180° in relation to the first output beam. For capturing the first output beam 18, a first (IR) detector 20 is provided. The constructively superposed output beam 19 is captured at a second (IR) detector 21.

In an alternative configuration, the beam-combining element 16 and the beam-splitting element 4 are formed by a unified beam-splitting and -combining element, for example when a Michelson interferometer is used (not illustrated).

A phase-control element 22 is further provided for producing a phase shift, i.e. a change in the phase difference between the measurement beam 6 and the reference beam 7. In the illustrated configuration, the phase-control element includes a piezo actuator 23 for adjusting the mirror 15 in the direction of the arrow 24. For this purpose, the piezo actuator 23 is connected in a manner known per se to a controllable voltage source 25.

In the illustrated configuration, the signals of the first detector 20 and of the second detector 21 are first fed to an apparatus 26 for signal processing and demodulation. The processed signals are transferred to a subtractor 27, with which a differential signal 28 between the first output beam 18 and the second output beam 16 is generated. When the intensity measured at the detectors shows a strong dependence on the wavelength of the laser beam, the differential signal can be scaled to the latter, e.g. by scaling the difference to the sum of the signals. By this means, the stability of the control and thus the sensitivity of the refractive index measurement can be increased. The (scaled) differential signal 28 is used as an input signal for a control unit 29, with which the differential signal 28 is controlled by setting the phase-control element 22 to a predetermined setpoint 30. The position of the phase-control element 22 is thus modified by the control unit 29 for each wavelength of the laser 2 in the IR interval to be analyzed so that the desired setpoint 30, preferably zero, is obtained. The position of the phase-control element depending on the wavelength of the laser beam is stored in a memory 35 in order to thus record a spectrum of the refractive index of the sample.

Figure 2:
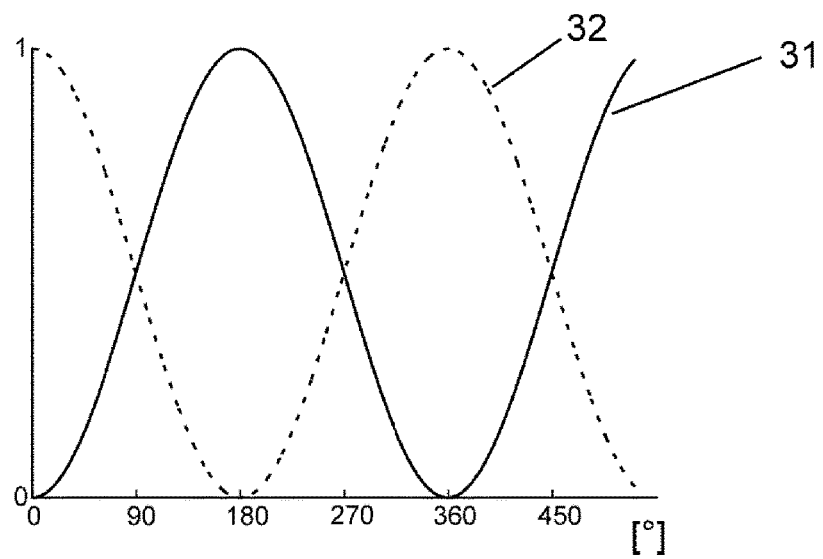
FIG. 2 shows schematically the signals of a first detector for a first output beam and of a second detector for a second output beam, respectively depending on the position of a phase-control element.

FIG. 2 shows schematically, on the one hand, the (scaled) signal of the first detector 20 for the first output beam 18 (continuous line 31) and, on the other hand, the (scaled) signal of the second detector 21 for the second output beam 19 (dotted line 32), respectively depending on the phase (in degrees) of the phase-control element 22 (x axis). As a result, the signals 31, 32 are shifted by 180° with respect to each other. According to FIG. 2, the signals are shown for the case that the sample and reference are identical. By introducing an analyte into the sample, the signals 31 and 32 are shifted along the x axis to the same extent. With the aid of the control unit 29 described in the foregoing, the differential signal represented in FIG. 3 is adjusted from the signal 31 for the first output beam 18 and the signal 32 for the second output beam 19 to the setpoint zero.

Figure 3:
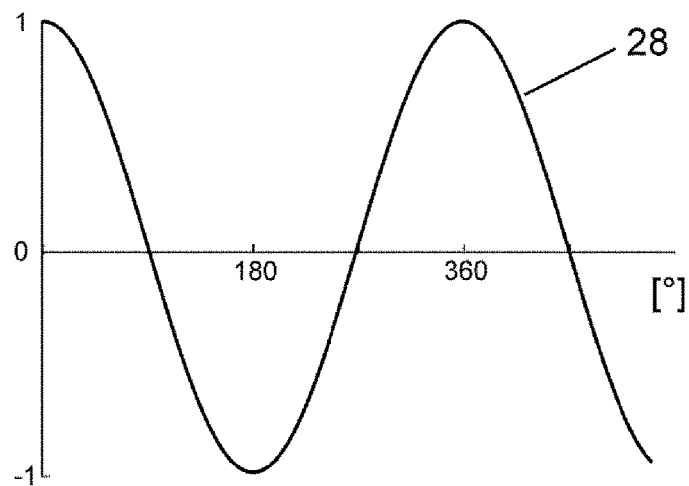
FIG. 3 shows schematically a differential signal between the signals of the first and second detectors.

As is evident from FIG. 3, the differential signal 28 disappears at a phase of 90°, wherein the control unit 29 is set to this setpoint. Moreover, the differential signal exhibits the steepest pitch at this phase, whereby, by measuring the differential signal 28, it is possible to measure the value on the x axis and thus the refractive index by means of the described control with maximum precision.

Figure 4:
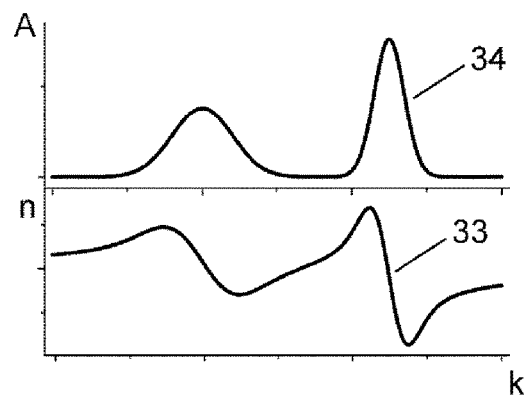
FIG. 4 shows schematically the spectrum of the refractive index (bottom) and of the absorption (top) of the sample.

In FIG. 4, a spectrum 33 of the refractive index n of the sample depending on the wave numbers k is represented schematically (below). The wavelength-dependent refractive index is directly proportional to the control signal for the phase-control element 22, which is recorded when tuning the laser 2. Further represented in FIG. 4 is a spectrum 34 of the absorption A of the sample. The refractive-index spectrum 33 of the analyte in the sample is linked to the absorption spectrum 34 via the Kramers-Kronig relations. It shows characteristic changes at those wavelengths at which absorption bands occur. These changes scale, in solutions of the analyte in a solvent or matrix (substrate), with the concentration of the analyte. The measurement of the refractive-index spectrum 33 thus permits qualitative and quantitative determinations. Further, the absorption can be measured with the interferometric device 1. The two spectra can subsequently be used together for the evaluation. For example, the measurement can be conducted as in EP 2 738 543 A2 (in this case, the value of the scaled differential signal would be −1 or +1) or by first blocking the probe beam after or before the refractive-index measurement analogously to a standard transmission measurement and then recording the reference beam and respectively the sum of the detector signals. This would be a classic, non-interferometric absorption measurement. The absorption is then obtained by division of the two signals and logarithmizing.

Figure 5:
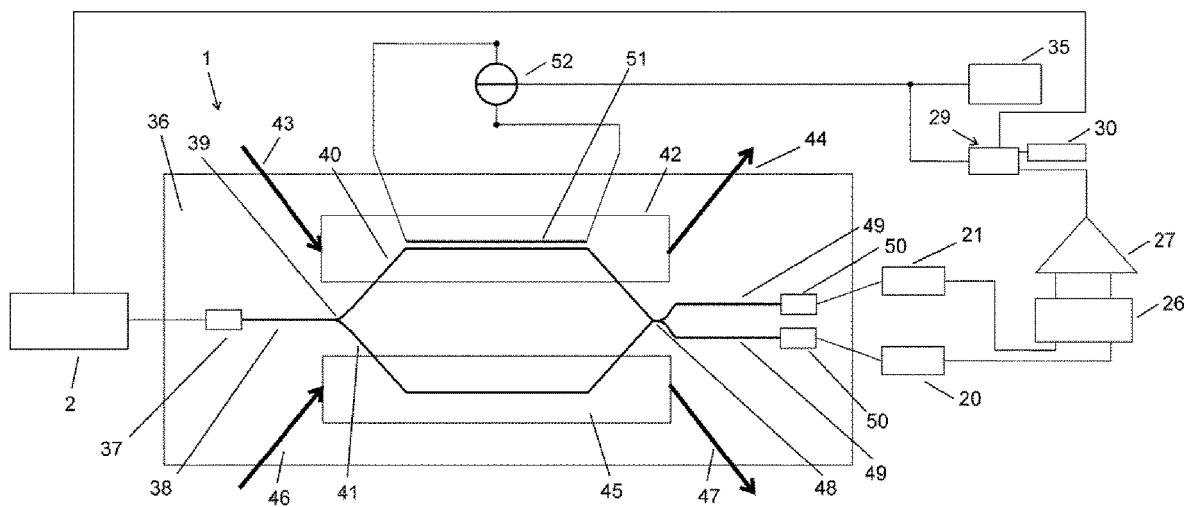
FIG. 5 shows an interferometric device in accordance with a second preferred embodiment.

In FIG. 5, an alternative configuration of the interferometric device 1 is shown, wherein the same references are used in the following for (functionally) identical elements.

In this embodiment, a die, chip 36 in the following, is provided. Located on the chip 36 is an input coupler 37 with which the laser beam of the laser 2 is coupled into an input optical waveguide 38. By means of a suitable 1×2 coupler 39, the laser beam is split, preferably in equal parts, into a measurement-beam optical waveguide 40 and a reference-beam optical waveguide 41. The sample is guided along a first microfluidic channel 42 with an inlet 43 and an outlet 44 via the measurement-beam optical waveguide 40. Via the evanescent field, the sample interacts with the measurement beam, by which means its propagation speed in the measurement-beam waveguide 40 is influenced. The reference arm includes a second microfluidic channel 45, with a further inlet 46 and a further outlet 47. Preferably, the sample and reference arms are configured so as to be identical. Subsequently, the measurement and reference beams are brought to interference in a 2×2 coupler 48 in a phase-sensitive manner and, guided in unequal parts depending on the phase in accordance with FIG. 2, by means of waveguides 49 to two output couplers 50. The intensity of the decoupled light is measured at the first detector 20 and at the second detector 21. The difference between the two detector signals is compared in the control unit 29 with the setpoint 30 (here zero). The control unit 29 controls the position of the phase-control element 22, which is integrated in one of the two (or both) arms of the interferometer. In the configuration according to FIG. 5, the phase-control element 22 includes a resistive heating element 51 in the immediate vicinity of the measurement-beam optical waveguide 40. The heating element 51 is connected to a controllable power source 52, which is set by the control unit 29 so that the necessary phase shift for reaching the setpoint of the differential signal is attained.

The invention claimed is:

1. A method for spectroscopic or spectrometric analysis of a sample, with steps of:
    a) generating a laser beam with a wavelength,
    b) splitting the laser beam into a measurement beam and a reference beam,
    c) interaction of the sample with the measurement beam,
    d) interaction of a reference with the reference beam,
    e) superposing the measurement beam and the reference beam so that a first output beam and a second output beam are respectively obtained, the phases of which are shifted by 180° with respect to one another,
    f) detecting the first output beam,
    g) detecting the second output beam,
    h) forming a differential signal between the first output beam and the second output beam,
    i) adjusting the differential signal to a predetermined setpoint by setting a phase difference between the measurement beam and the reference beam,
    j) deducing a refractive index of the sample from the setting of the phase difference between the measurement beam and the reference beam,
    k) repeating the steps a) to j) for further wavelengths of the laser beam for capturing a spectrum of a refractive index of the sample.

2. The method according to claim 1, wherein the differential signal between the first output beam and the second output beam is adjusted to a setpoint of zero.

3. The method of claim 1, wherein the laser beam is generated with the wavelength in an infrared spectral range.

4. The method of claim 1, wherein, for repeating the steps a) to j), the further wavelengths of the laser beam are in an infrared spectral range.

5. An interferometric device for spectroscopic analysis of a liquid sample, comprising:
    a tunable laser for emitting a laser beam,
    a beam-splitter for splitting the laser beam into a measurement beam and a reference beam,
    a measurement chamber for interaction between a sample and the measurement beam,
    a reference chamber for interaction between a reference and the reference beam,
    a beam-combiner with a first output port for interferometric superposition of the measurement beam and the reference beam as a first output beam and with a second output port for interferometric superposition of the measurement beam and the reference beam as a second output beam,
    a first detector for capturing the first output beam,
    a second detector for capturing the second output beam,
    a phase-controller for setting a phase between the measurement beam and the reference beam,
    a subtractor for forming a differential signal between the first output beam and the second output beam, and
    a control unit which adjusts the differential signal via the phase-controller to a predetermined setpoint and tunes a wavelength of the laser beam in order to deduce a spectrum of a refractive index of the sample from a position of the phase-controller depending on the wavelength of the laser beam.

6. The interferometric device according to claim 5, wherein an input optical waveguide is provided for the laser beam, a measurement-beam optical waveguide is provided for the measurement beam and a reference-beam optical waveguide is provided for the reference beam.

7. The interferometric device according to claim 6, wherein the measurement chamber includes a first microfluidic channel adjacent to the measurement-beam optical waveguide and/or wherein the reference chamber includes a second microfluidic channel adjacent to the reference-beam optical waveguide.

8. The interferometric device according to claim 6 wherein the phase-controller includes a heating element for the measurement-beam optical waveguide or for the reference-beam optical waveguide.

9. The interferometric device of claim 8, wherein the heating element is a resistance heating element.

10. The interferometric device according to claim 6 wherein the beam-splitter includes a 1×2 coupler and the beam-combiner includes a 2×2 coupler.

11. The interferometric device according to claim 5, wherein the measurement chamber is configured as a first flow cell in a beam path of the measurement beam and the reference chamber is configured as a second flow cell in a beam path of the reference beam.

12. The interferometric device according to claim 11, wherein the phase-controller comprises a mirror and a piezo actuator for adjusting the mirror.

13. The interferometric device according to claim 11 wherein the beam-splitter comprises a first beam splitter and the beam-splitter comprises a second beam splitter.

14. The interferometric device of claim 5, wherein the laser beam is emitted in an infrared spectral range.

* * * * *